United States Patent [19]

McCrossen

[11] Patent Number: 5,378,008
[45] Date of Patent: Jan. 3, 1995

[54] TRAILER TONGUE LOCKING DEVICE HAVING THEFT PREVENTION FEATURE

[76] Inventor: Gurdon A. McCrossen, 9828 S. 230th E. Ave., Broken Arrow, Okla. 74014

[21] Appl. No.: 34,682

[22] Filed: Mar. 19, 1993

[51] Int. Cl.$^6$ .............................................. B60D 1/06
[52] U.S. Cl. ...................................... 280/507; 70/232; 70/258
[58] Field of Search ............... 280/507, 511, 512, 513, 280/504, 423.1, 425.1, 477, 479.1, 479.2, 479.3, 515; 70/232, 258

[56] References Cited

U.S. PATENT DOCUMENTS

| | | | |
|---|---|---|---|
| 2,470,870 | 5/1949 | Scholten | 280/512 |
| 2,515,856 | 7/1950 | Brougher | 280/512 X |
| 2,834,611 | 5/1958 | Chenette | 280/511 |
| 4,082,311 | 4/1978 | Hamman | 280/512 X |
| 4,428,596 | 1/1984 | Bell et al. | 280/507 |
| 4,577,884 | 3/1986 | Harris | 280/507 |
| 4,774,823 | 10/1988 | Callison | 280/507 X |
| 5,040,817 | 8/1991 | Dunn | 280/504 X |

*Primary Examiner*—Karin L. Tyson
*Assistant Examiner*—F. Zeender
*Attorney, Agent, or Firm*—Roy A. Ekstrand

[57] ABSTRACT

A trailer tongue locking device includes a hitch bar coupled to the towing vehicle which supports an upwardly extending ball member and a downwardly extending lock nut terminating in a downwardly tapered chamfered surface. An upper and lower plate are securable to the tongue portion of the trailer locking device in an anti-theft locking attachment. The lower plate defines an elongated slot which is aligned beneath the socket portion of the trailer tongue and which receives the chamfered surface of the lock nut. The cooperation of the lock nut, the chamfered surface and the socket together with the ball member provides a secure safe attachment between the towing vehicle and trailer while the degree of movement of the chamfered surface of the lock nut within the slot permits the necessary relative motion within the trailer tongue locking device to accommodate normal towing circumstances.

9 Claims, 2 Drawing Sheets

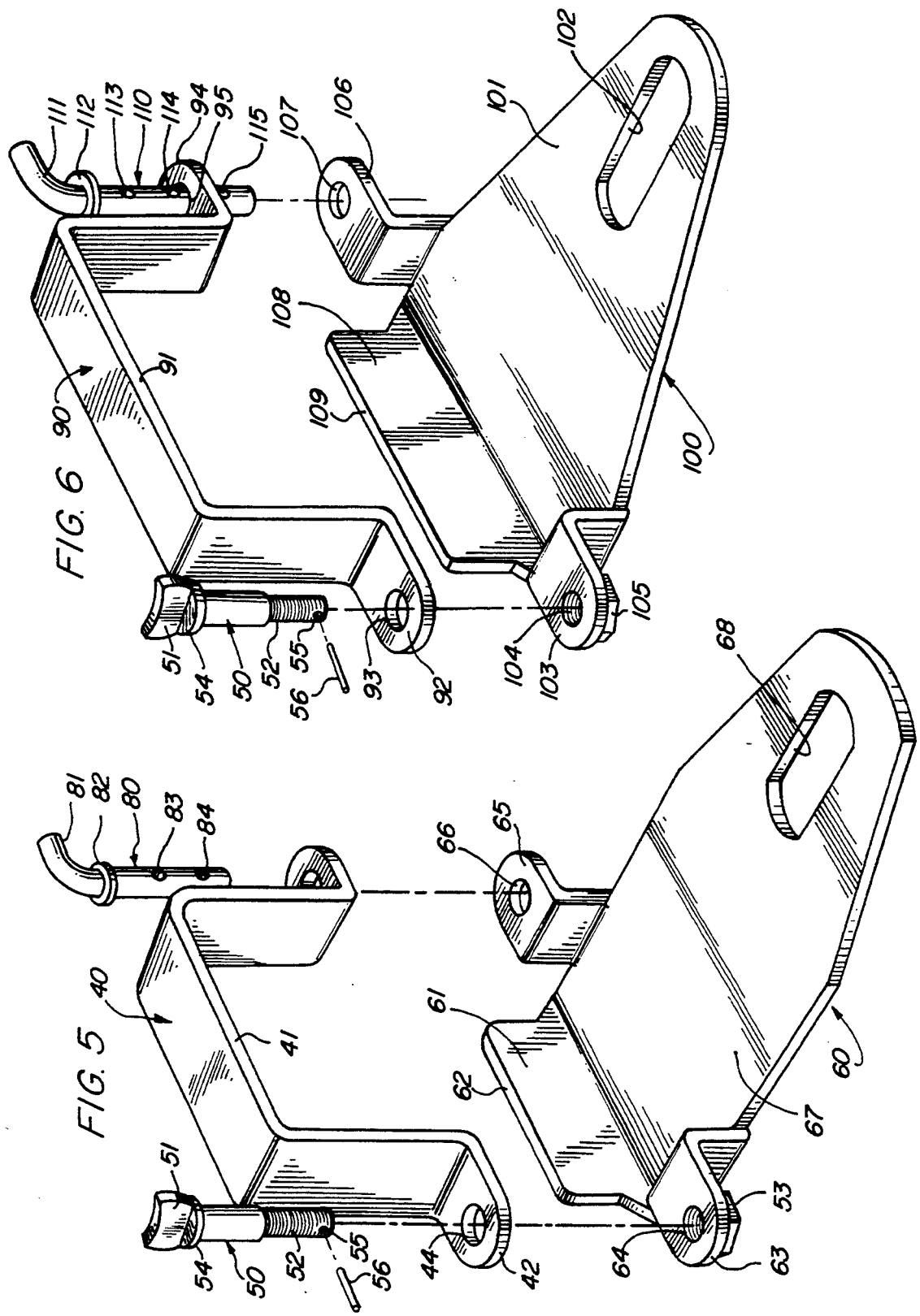

TRAILER TONGUE LOCKING DEVICE HAVING THEFT PREVENTION FEATURE

FIELD OF THE INVENTION

This invention relates generally to trailer hitches and particular to those utilized by recreational vehicle, car or flight truck type users.

BACKGROUND OF THE INVENTION

One of the more commonplace sites along many of the world highways is that presented by a towing vehicle such as a recreational vehicle, automobile or small truck having an attached trailer. Towing vehicles and trailer combinations are, of course, found in a variety of types and uses ranging from heavy industrial or commercial activities to lighter commercial and recreational activities. While heavy industrial trucks and larger commercial trucks readily employ trailer hitches to secure the trailer to the towing vehicle which are strong, reliable and extremely safe, their use has not extended into light truck, recreational and automobile towing apparatus due to the extremely large heavy structure and often unsightly appearance which they present. For the most part, recreational and light truck trailer hitches have comprised smaller less obtrusive and lighter structures.

The most common type of trailer hitch apparatus used in recreational and light truck towing activities is a ball and socket type trailer hitch combination in which the vehicle supports a rearwardly extending hitch member terminating in an upwardly extending ball support. The trailer includes a forwardly extending tongue element which supports a downwardly extending socket. The socket is received upon the ball and a lock mechanism operative on the trailer socket member secures the trailer tongue to the hitch ball in a ball and socket attachment. For safety purposes, a supplemental chain attachment is secured between the vehicle and the trailer to preclude inadvertent separation of the hitch. The object of the ball and socket-type hitch is to permit the necessary change in angle both horizontally and vertically which arise as the vehicle and its tow trailer negotiate turns and up and down hills or driveways or the like. In most trailer use, the hitch mechanism is subjected to substantial stress due to bumps in the road, abrupt turning activities or load shifting within the trailer.

It is well recognized by those using and regulating the use of trailer hitches to tow trailers that the separation of the trailer from the towing vehicle when the vehicle is in motion represents a potential for disaster. Thus, safety chains or similar safety apparatus are required by law in most industrialized nations of the world. However, a somewhat less well recognized potential for great harm in trailer towing operations is the loss of control resulting from trailer hitch separation notwithstanding the proper use of safety chains. Safety chains preclude complete separation between the towing vehicle and the trailer if properly used. However, once the hitch is separated, the chains do not provide control capability but merely loosely couple the trailer to the towing vehicle permitting wild gyration and motion as the vehicle driver attempts to bring the vehicle and trailer to a stop or otherwise avoid harm.

Because simple safety chains are recognized to be insufficient for complete security, practitioners in the art have endeavored to provide improved trailer hitch locks and safety mechanisms. For example, U.S. Pat. No. 4,428,596 issued to Bell, et al. sets forth an TRAILER SAFETY HITCH utilizing a ball and socket coupling together with a plate connected between the trailer tongue and the hitch member upon the vehicle. The plate is intended to coact with the ball and socket connection to prevent dislodgement of the ball from the socket. The plate defines a keyhole-shaped slot such that the plate can be placed on the hitch member and moved to a position which engages small portions of the keyhole slot. A pair of upwardly extending lugs are pivotally securable to the trailer tongue by a removable pin.

While practitioners have provided some improvement in the reliability and safety of trailer hitch combinations, the structures provided often restrict vehicle and trailer motion or fail to prevent theft or other undesired tampering. As a result, there remains a continuing need in the art for evermore improved safety and anti-theft featured trailer hitch structures.

SUMMARY OF THE INVENTION

Accordingly, it is a general object of the present invention to provide an improved trailer tongue locking device. It is a more particular object of the present invention to provide an improved trailer tongue locking device which also provides effective theft prevention while preserving the motion capability between the towing vehicle and the trailer.

In accordance with the present invention, there is provided for use in coupling a towing vehicle to a trailer having a tongue supporting a ball socket, a trailer tongue locking device comprises: a first member defining an elongated slot; attachment means for securing the first member to the trailer tongue such that the elongated slot is positioned beneath, spaced from and aligned with the ball socket; a hitch bar securable to the towing vehicle; and a ball member secured to the hitch bar and defining an upwardly extending ball portion and a downwardly extending portion, the ball member being received within the ball socket and the downwardly extending portion extending into the slot to couple the trailer to the towing vehicle.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 5 sets forth a perspective assembly view of the safety plate portion of the present invention trailer tongue locking device; and FIG. 6 sets forth a perspective assembly view of the safety plate portion of an alternate embodiment of the present invention trailer tongue locking device.

DESCRIPTION OF THE PREFERRED EMBODIMENTS

Figure 1:
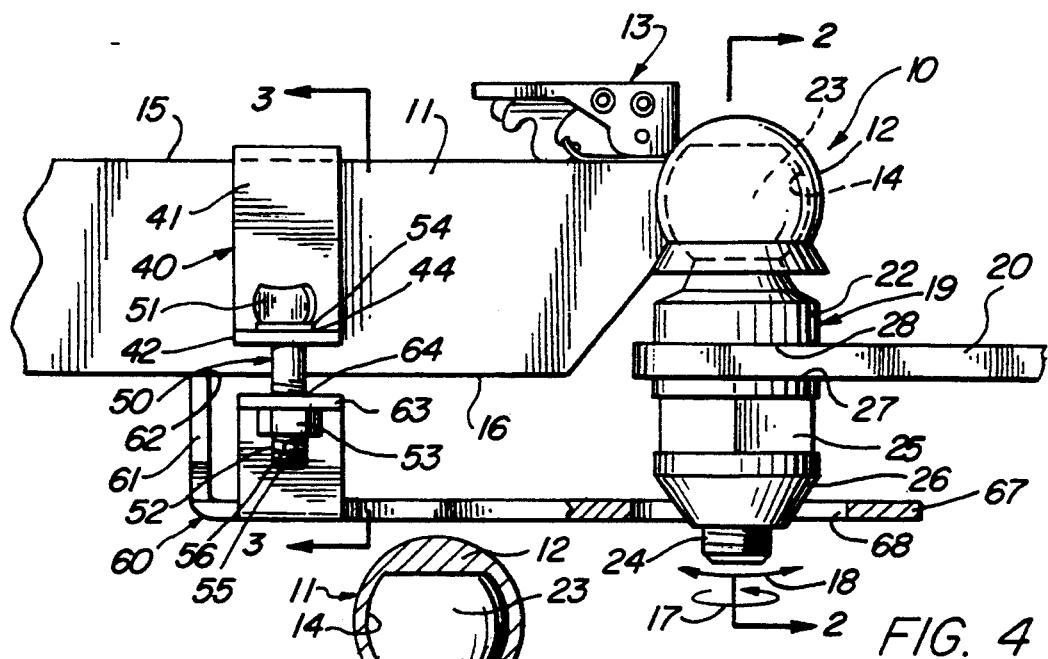
FIG. 1 sets forth a partial section view of a trailer tongue locking device constructed in accordance with the present invention.

FIG. 1 sets forth a trailer tongue locking device constructed in accordance with the present invention and generally referenced by numeral 10. A trailer tongue 11 constructed in accordance with conventional fabrication techniques defines a generally rectangular cross-sectional member having an upper surface 15 and a lower surface 16. Tongue 11 further includes a generally spherical socket housing 12 defining an interior spherical socket 14. A socket lock mechanism 13 also constructed in accordance with conventional fabrication techniques is supported upon upper surface 15 of trailer tongue 11. Thus, in accordance with an important aspect of the present invention, trailer tongue 11, socket housing 12 and socket lock mechanism 13 remain constructed in accordance with conventional fabrication techniques. Trailer tongue locking device 10 includes an upper plate 40 and a lower plate 60 secured to trailer tongue 11 in a removable attachment which leaves trailer tongue 11 unaltered when trailer tongue locking device 10 is removed. More specifically, an upper plate 40 comprises a generally U-shaped member having an inverted U-shaped portion 41 resting upon upper surface 15 of tongue 11 and a pair of outwardly extending flanges 42 and 43, the latter seen in FIG. 3. As is better seen in FIG. 5, flanges 42 and 43 define apertures 44 and 45 respectively. A lower plate 60 comprises a generally planar member having a pair of raised flange portions 63 and 65 (the latter seen in FIG. 5) which define a corresponding pair of apertures 64 and 66 (also better seen in FIG. 5). Lower plate 60 further defines a generally planar slot plate 67 defining an elongated slot 68 therein and an upwardly extending spacer flange 61. Spacer flange 61 terminates in a horizontal edge 62 which rests against lower surface 16 of trailer tongue 11 to space slot plate 67 with respect to socket housing 12. A fastener 50 defines a head key 51 and a shoulder 54 as well as a threaded body 52. In the assembled position shown, fastener 50 is received within apertures 44 and 64 of flanges 42 and 63 respectively. Threaded body 52 of fastener 50 is threadably engaged within a lock nut 53 which is preferably welded to the undersurface of flange 63.

Figure 3:
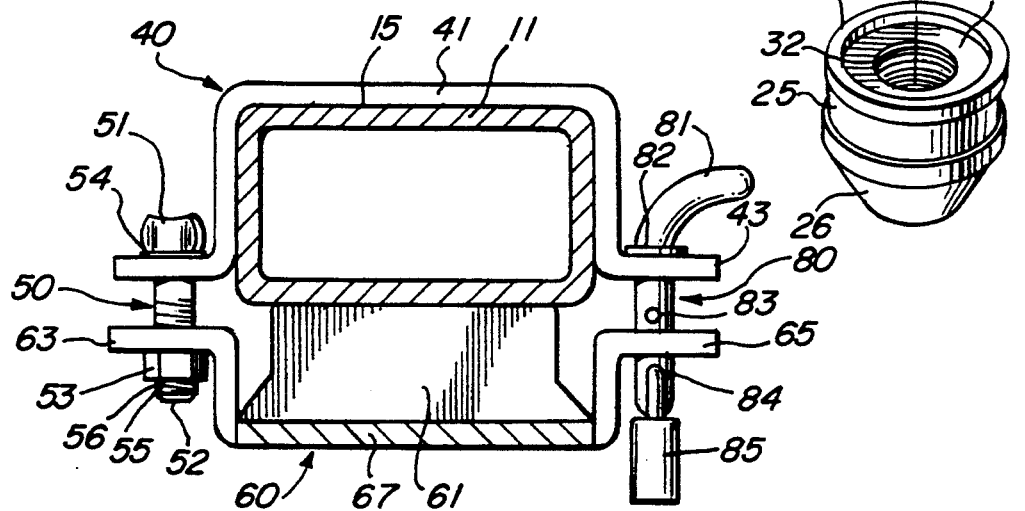
FIG. 3 sets forth a section view of the present invention trailer tongue locking device taken along section lines 3—3 in FIG. 1.

With temporary reference to FIG. 3, the remaining attachment of upper plate 40 to lower plate 60 is provided by an elongated lock pin 80 having a curve handle 81, a shoulder 82 and a plurality of apertures 83 and 84 extended therethrough. In the extended position, lock pin 80 is received within apertures 45 and 66 of flanges 43 and 65 respectively (seen in FIG. 5). A convention pad lock 85 is passed through aperture 84 to secure and lock pin 80 in place and complete the attachment of upper plate 40 and lower plate 60 to trailer tongue 11.

Returning to FIG. 1, it should be noted that in accordance with an important aspect of the present invention, upper plate 40 and lower plate 60 are positioned upon trailer tongue 11 such that slot 68 in slot plate 67 is generally centered beneath socket 14 of socket housing 12. An elongated hitch bar 20 having a generally planar configuration is secured at one end to a towing vehicle (not shown) and extends between slot plate 67 of lower plate 60 and socket housing 12. Hitch bar 20 defines an aperture 21 (better seen in FIG. 2). A ball member 19 includes a spherical shaped ball portion 23 supported by a ball pedestal 22. Ball pedestal 22 defines a shoulder 28 from which an elongated threaded shaft 24 extends downwardly through aperture 21 of hitch bar 20. In its preferred form, threaded shaft 24 is left hand threaded to frustrate the theft or tampering efforts of others and to provide an anti-theft characteristic to the present invention trailer tongue locking device. A lock nut 25 defines a threaded aperture 32 which is also preferably left hand threaded and thus threadably received upon threaded shaft 24. Lock nut 25 defines an upper shoulder 27 and a recess 30. As is better seen in FIG. 4, a lock washer 31 is receivable within recess 30 to provide an improved secure attachment of lock nut 25 against the undersurface of hitch bar 20. Lock nut 25 further defines a downwardly extending chamfer surface 26 which in the assembled position shown in FIG. 1 is received within slot 68 of slot plate 67. In the preferred assembly of the present invention trailer tongue locking device, lock nut 25 is securely tightened upon threaded shaft 24 such that lock washer 31 engages hitch bar 20 and shoulder 28 of ball pedestal 22 and shoulder 27 of lock nut 25 are compressibly tightened and secured against hitch bar 20.

The present invention trailer tongue locking device is secured or coupled to trailer tongue 11 by initially positioning upper flange 40 upon trailer tongue 11 and actuating socket 13 to permit ball 23 to be received and secured within socket 14 of socket housing 12. Thereafter, lower plate 60 is coupled to tongue 11 and fastener 50 and lock pin 80 are passed through their respective apertures in flanges 42 and 63 and flanges 43 and 65 respectively. With lower plate 60 and upper plate 40 somewhat loosely coupled to tongue 11, the position of lower plate 60 is adjusted to receive chamfer 26 within the approximate center of slot 68. Once lower plate 60 and upper plate 40 area properly positioned, fastener 50 may be tightly secured using the threaded engagement of fastener 50 and lock nut 53 and the padlocking of lock pin 80. At this point, trailer tongue locking device 10 is secured and the coupling of the towing vehicle and trailer is complete.

In accordance with an important aspect of the present invention, it should be noted that the cooperation of chamfer surface 26 of lock nut 25 within slot 68 of slot plate 67 precludes ball 23 from removal from socket 14 notwithstanding the operative condition of socket lock mechanism 13. Thus, additional safety of attachment is provided in the event of failure of lock mechanism 13. Thus, it should be noted that while withdrawal from ball 23 from socket 14 is completely precluded by the cooperation of chamfer 26 and slot 68, the angular movement of ball member 19 as ball 23 undergoes pivotal motion within socket 14 is free and unobstructed. Thus, as the towing vehicle turns, hitch bar 20 changes angular position with respect to trailer tongue 11 which in turn causes ball member 19 to pivot about its vertical axis in the manner shown by arrow 17. This pivotal motion is facilitated by the slight clearance between chamfered surface 26 and slot 68. Similarly, in the event the towing vehicle secured to hitch bar 20 encounters an upward or downward incline surface or bump, the vertical pivoting of hitch bar 20 is accommodated as ball member 19 pivots within socket 14 and chamfered surface 26 of lock nut 25 moves within slot 68 in the manner indicated by arrows 18. In further accordance with an important aspect of the present invention and as is better seen in FIG. 2, the structure of slot 68 and chamfered surface 26 of lock nut 25 are provided with a very small clearance in the direction transverse to the anticipated direction of vehicle travel. As a result, stresses between hitch bar 20 and trailer tongue 10 which would tend to permit the towed trailer to tip excessively and potentially tip over are resisted by the interaction of chamfered surface 26 and slot 68.

Figures 2, 4:
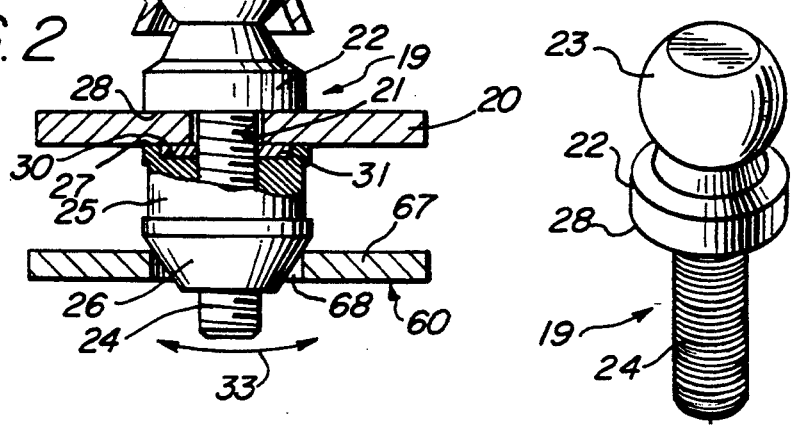
FIG. 2 sets forth a section view of a portion of the present invention trailer tongue locking device taken along section lines 2—2 in FIG. 1.
FIG. 4 sets forth a perspective assembly view of the ball supporting portion of the present invention trailer tongue locking device.

FIG. 2 sets forth a section view of trailer tongue locking device 10 taken along section lines 2—2 in FIG. 1. As described above, tongue 11 defines a socket housing 12 having a spherical socket 14 defined therein. A hitch bar 20 defines an aperture 21 while a generally planar lower plate 60 defines a slot plate 67 having a slot 68 formed therein. A ball member 19 includes a ball pedestal 22 supporting a generally spherical surfaced ball 23 and a shoulder 28. Ball member 19 further includes a downwardly extending threaded shaft which as described above is preferably threaded with a left hand thread. A lock nut 25 defines an upper shoulder 27 and a recess 30. A lock washer 31 is received within recess 30 as lock nut 25 is threadably secured to threaded shaft 24. Lock nut 25 further defines a downwardly extending chamfered surface 26 which is received within slot 68. As described above, the position of slot plate 67 of lower plate 60 with respect to socket 14 of socket housing 12 is aligned such that chamfered surface 26 of lock nut 25 is received within slot 68. Accordingly, vertical movement of ball member 19 which would otherwise permit ball 23 to be withdrawn from socket 14 is precluded by the interaction of slot 68 against chamfered surface 26. In addition, pivotal motion of ball member 19 in the transverse direction indicated by arrows 33 is limited by the clearance between chamfered surface 26 of lock nut 25 and the sides of slot 68 of lower plate 60. Thus, the above-described protection against the cap sizing of the trailer coupler to the present invention trailer tongue locking device is greatly inhibited.

FIG. 3 sets forth a section view of trailer tongue locking device 10 taken along section lines 3—3 in FIG. 1. As described above, trailer tongue 11 defines a generally rectangular cross-sectional member having a planar upper surface 15 and a planar lower surface 16. Upper plate 40 defines an inverted U-shaped portion 41 having a pair of outwardly extending flanges 42 and 43. As is better seen in FIG. 5, flanges 42 and 43 define respective apertures 44 and 45. Lower plate 60 defines a generally planar slot plate 67 having an upwardly extending spacer flange 61 which terminates in a horizontal edge 62. Lower plate 60 further includes a pair of outwardly extending raised flanges 63 and 65 which as is better seen in FIG. 5 define respective apertures 64 and 66.

In the assembled position shown in FIG. 3, lower plate 60 is secured to upper plate 40 by a fastener 50 on one side and a lock pin 80 on the remaining side such that U-shaped portion 41 of upper plate 40 is received upon trailer tongue 11 and edge 62 of spacer flange 61 is maintained against lower surface 16. Fastener 50 includes a threaded shaft body 52 which is passed through apertures 44 and 64 of flanges 42 and 63 respectively and which defines an aperture 55 which receives a roll pin 56. Threaded body 52 is threadably received within lock nut 53 which is preferably welded to the undersurface of flange 63. Roll pin 56 is secured within aperture 55 to preclude removal of fastener 50 and thereby prevent tampering or theft. Fastener 50 is tightened by turning head key 51 until the desired compressive force is produced between upper plate 40 and lower plate 60 incaptivating trailer tongue 11. Lock pin 80 is received within apertures 45 and 66 of flanges 43 and 65 respectively such that shoulder 82 rests upon flange 43. Thereafter, a conventional padlock 85 is passed through a convenient one of the apertures within lock pin 80 such as aperture 84 to complete the attachment and security of the present invention trailer tongue locking device. It should be noted that upper plate 40 and lower plate 60 are not removable from tongue 11 without the removal of padlock 85 and further that ball member 19 (seen in FIGS. 1 and 2) and hitch bar 20 are not removable or separable from trailer tongue 11 without the removal of upper plate 40 and lower plate 60. Thus, padlock 85 is operative by securing lock pin 80 to entirely preclude the separation of the present invention trailer tongue locking device and thus provide secure anti-theft protection.

FIG. 4 sets forth a perspective assembly view of ball member 19 to lock nut 25. As described above, ball member 19 includes a ball pedestal 22 defining a lower shoulder 28 and a spherical ball 23. A threaded shaft 24 which is preferably threaded in a left hand manner extends downwardly from pedestal 22. Lock nut 25 defines a downwardly tapered chamfer 26 and interior threaded aperture 32 as well as an upper shoulder 27 and a recess 30. Recess 30 is provided to receive lock washer 31 which compresses and secures lock nut 25 and prevents its loosening.

FIG. 5 sets forth a perspective assembly view of upper plate 40 and lower plate 60. As described above, upper plate 40 defines an inverted U-shaped portion 41 having a pair of outwardly extending flanges 42 and 43. A pair of apertures 44 and 45 are defined within flanges 42 and 43 respectively. Lower plate 60 includes a generally planar slot plate 67 having an elongated slot 68 formed at one end thereof and a vertically extending spacer flange 61 at the remaining end thereof. Spacer flange 61 defines a horizontal edge 62. A pair of raised outwardly extending flanges 63 and 65 defining apertures 64 and 66 respectively extend upwardly from slot plate 67 intermediate slot 68 and spacer flange 61.

A fastener 50 having a threaded body 52 and a head key 51 defining a shoulder 54 are received within apertures 44 and 64 in the above described attachment. Flange 63 supports a lock nut 53 for threaded engagement with body 52 of fastener 50. A lock pin 80 having a handle 81 and a shoulder 82 defines a plurality of apertures such as aperture 83 and 84 and is received within apertures 45 and 66 of flanges 43 and 65. As is better seen in FIG. 3, a conventional padlock 85 is securable to lock pin 80 to provide theft protection for the present invention trailer tongue locking device.

FIG. 6 sets forth an alternate embodiment of the present invention configured to accommodate a somewhat wider trailer tongue which comprises an upper plate 90 and lower plate 100. Upper plate 90 includes an inverted U-shaped portion 91 having a pair of outwardly extending flanges 92 and 94. Flanges 92 and 94 define respective apertures 93 and 95. Lower plate 100 defines a generally planar slot plate 101 having an elongated slot 102 formed at one end thereof and a vertically extending spacer flange at the remaining end thereof. Spacer 108 defines a horizontal edge 109. Lower plate 100 further defines a pair of raised outwardly extending flanges 103 and 106 defining apertures 104 and 107 respectively. A lock nut 105 is preferably welded to the undersurface of flange 103 in alignment with aperture 104.

As mentioned above, upper plate 90 and lower plate 100 are configured to compensate for installation upon a somewhat cross-sectional tongue of a trailer. However, in all other respects, the embodiment shown in FIG. 6 should be understood to function in the same manner and be assembled to the trailer in the same manner described above for the embodiment shown in FIGS. 1 through 5. Thus, hitch bar 20 and ball member 19 are operative on the towing vehicle for the embodiment shown in FIG. 6 in the same manner as described above. Similarly, upper plate 90 and lower plate 100 are secured using fastener 50 in the same manner described for upper plate 40 and lower plate 60 in FIGS. 1 through 5. By way of further similarity, a lock pin 110 substantially similar to lock pin 80 shown in FIG. 5 with the exception of slightly greater length defines a handle 111, a shoulder 112 and a plurality of apertures 113, 114 and 115. Thus, lock pin 110 is received within apertures 95 and 107 of flanges 94 and 106 respectively and padlocked therein in the manner shown for lock pin 80 in FIG. 3.

It will be apparent to those skilled in the art that a variety of trailer tongue sizes and shapes may be accommodated by the present invention trailer tongue locking device without departing from the spirit and scope of the present invention. It will be equally apparent to those skilled in the art that the present invention trailer tongue locking device may be fabricated using virtually any high strength material such as high strength steel or the like.

What has been shown is a trailer tongue locking device which provides security of attachment and coupling between a trailer and a towing vehicle which also provides theft prevention and tampering prevention. The trailer tongue locking device shown may be readily installed upon a trailer tongue without the need for drilling holes or welding or any other modification of the trailer tongue. Thus, the trailer tongue locking device shown may be readily moved from one trailer to another and leaves the trailer unaltered once removed. In addition, the present invention trailer tongue locking device precludes the separation of the ball and socket despite the failure of the conventional socket lock mechanism supported upon the trailer tongue. In addition, the secure attachment of the ball member to the hitch bar using a left handed thread provides a difficult to remove attachment on the part of would be thieves or tamperers since the likelihood of a left hand attachment is not readily discernible by examination of the trailer tongue locking device. The design of the lower bracket within the trailer tongue locking device shown provides ample clearance for steep grades, driveways, curbs and simultaneously prevents the trailer from turning over in response to typical stresses such as top heavy cargo loading or the like. In addition, once the trailer is removed from the ball of the vehicle and the lower bracket is installed upon the trailer tongue and padlocked, the trailer becomes virtually incapable of installation by a would be thief upon another towing vehicle and thus theft of the trailer alone is also frustrated.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in coupling a towing vehicle to a trailer having a tongue supporting a ball socket, a trailer locking device comprising:
    a first member defining a generally planar portion having an elongated slot therein and a spacer flange extending upwardly to said trailer tongue;
    attachment means for securing said first member to said trailer tongue such that said elongated slot is positioned beneath, spaced from and aligned with said ball socket, said attachment means including a second member coupled to the upper surface of said tongue and securing means for securing said first and second members together, said second member defining an inverted generally U-shaped portion receivable upon said trailer tongue;
    a hitch bar securable to said towing vehicle; and
    a ball member secured to said hitch bar and defining a ball portion extending upwardly above said hitch bar and a downwardly extending portion extending below said hitch bar and defining a chamfered surface having a taper which narrows in the downward direction; and
    said attachment means and said first member cooperating to secure said ball member within said ball socket and to slidably secure said downwardly extending portion within said slot to couple said trailer to said towing vehicle in a two-axis pivotal attachment, and
    said first and second members each defining a pair of outwardly extending flanges each having apertures defined therein and said securing means including a threaded fastener received within two said apertures and a locking pin received within the remaining two of said apertures.

2. A trailer locking device as set forth in claim 1 wherein said hitch bar defines an aperture and wherein said ball member includes:
    a ball pedestal coupled to said ball portion;
    a threaded shaft extending downwardly from said ball pedestal; and
    a lock nut threadably receivable upon said threaded shaft to captivate said hitch bar, said lock nut defining said downwardly extending portion having said chamfered surface thereon.

3. A trailer locking device as set forth in claim 2 wherein said threaded shaft defines a left hand thread.

4. A trailer locking device as set forth in claim 3 wherein said lock nut defines a recess and wherein said ball member further includes a lockwasher receivable within said recess.

5. For use in coupling a towing vehicle to a trailer having a tongue supporting a ball socket, a trailer locking device comprising:
    an upper plate defining a generally inverted U-shape;
    a lower plate defining a planar portion defining an elongated slot and a vertically extending spacer flange;
    a hitch bar coupleable to said towing vehicle;
    a ball member securable to said hitch bar and defining a ball portion extending above said hitch bar and a downwardly extending lower portion beneath said hitch bar; and
    attachment means for securing said upper and lower plates to said tongue to captivate said ball portion and said lower portion between said upper and lower plates such that said ball portion is received within said socket and said downwardly extending lower portion is slidingly received within said elongated slot to secure said hitch bar between said upper and lower plates in a two-axis pivotal attachment wherein said upper plate defines a first pair of outwardly extending end flanges and wherein said lower plate defines a second pair of outwardly extending flanges aligned with said first pair.

6. A trailer locking device as set forth in claim 5 wherein said first and second pairs of outwardly extending flanges each define apertures therethrough and wherein said attachment means comprises a fastener and a lock pin extending through said apertures.

7. For use in coupling a towing vehicle to a trailer having a tongue supporting a ball socket, a trailer locking device comprising:
- an upper plate defining a generally inverted U-shape;
- a lower plate defining a planar portion defining an elongated slot and a vertically extending spacer flange;
- a hitch bar coupleable to said towing vehicle;
- a ball member securable to said hitch bar and defining a ball portion extending above said hitch bar and a downwardly extending lower portion beneath said hitch bar; and
- attachment means for securing said upper and lower plates to said tongue to captivate said ball portion and said lower portion between said upper and lower plates such that said ball portion is received within said socket and said downwardly extending lower portion is slidingly received within said elongated slot to secure said hitch bar between said upper and lower plates in a two-axis pivotal attachment wherein said hitch bar defines an aperture and wherein said ball member includes:
- a ball pedestal coupled to said ball portion;
- a threaded shaft extending downwardly from said ball pedestal; and
- a lock nut threadably receivable upon said threaded shaft to captivate said hitch bar, said lock nut defining said downwardly extending portion and having a chamfered surface formed thereon.

8. A trailer locking device as set forth in claim 7 wherein said threaded shaft defines a left hand thread.

9. A trailer locking device as set forth in claim 8 wherein said upper plate defines a first pair of outwardly extending end flanges and wherein said lower plate defines a second pair of outwardly extending flanges aligned with said first pair.

* * * * *